2,913,446
POLYMERIZATION PROCESS

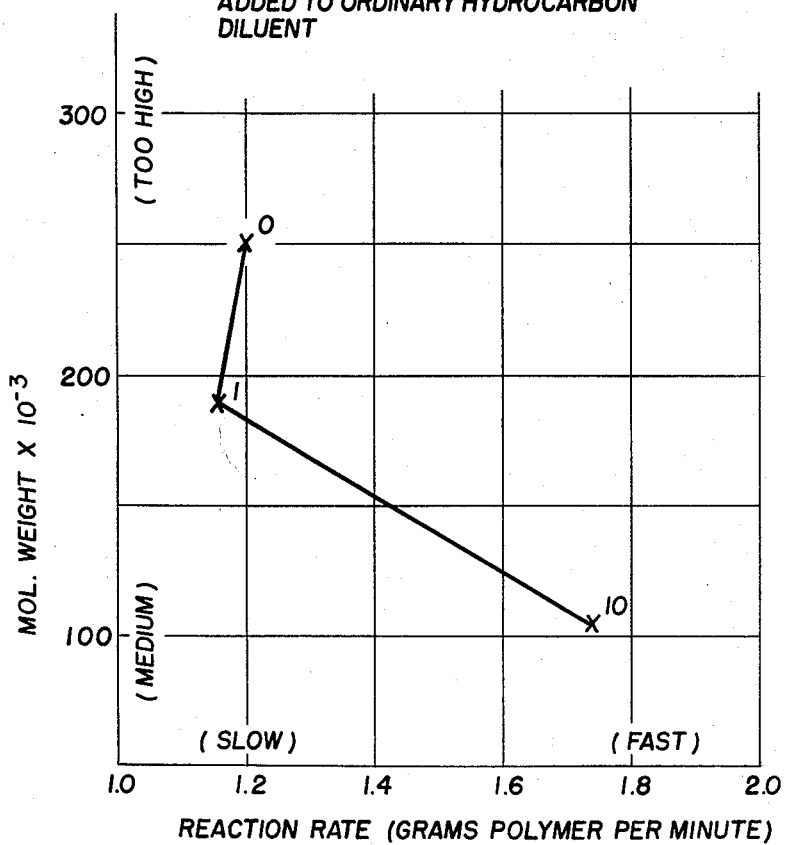

Neville Leverne Cull, Baker, and Joseph Kern Mertzweiller, Baton Rouge, La., assignors to Esso Research and Engineering Company, a corporation of Delaware Application February 21, 1956, Serial No. 566,960

7 Claims. (Cl. 260—94.9)

This invention relates to an improved process of carrying out the polymerization of unsaturated compounds such as ethylene, with a catalyst in the presence of an improved solvent to give improved polymerization results. The invention may be illustrated by the polymerization of ethylene by the use of a combination catalyst comprising a reducible metal compound such as $TiCl_4$ and a reducing agent such as aluminumtriethyl, in the presence of a solvent or reaction diluent comprising a substantial amount of a polar non-aromatic organic compound such as perfluoromethylcyclohexane, such as a mixture of 1 to 30% of this compound in 99 to 70% of normal heptane. The presence of the halogenated solvent greatly accelerates the polymerization reaction and gives better control of the molecular weight of the polymerization product.

This invention may be applied to the polymerization of various polymerizable unsaturated organic compounds, but is particularly intended to apply to the polymerization of olefins such as ethylene, propylene, and the like. It is desirable to use substantially pure olefin, and if necessary the olefin may be purified by various known methods such as by fractionation, washing or scrubbing with a solvent for the impurities, contacting with a dehydrating agent such as activated alumina or silica gel, etc. Ethylene gas may also be purified by scrubbing with an active agent such as aluminum triethyl to remove trace impurities which would interfere with the combination catalyst.

In carrying out the present invention the contacting of the ethylene with the polymerization catalyst may be effected in various ways but the preferred method is to mix the two catalyst components together, preferably in the presence of a solvent or diluent which is preferably the same as the one used for the major polymerization reaction liquid medium, and then add the prepared catalyst into the polymerization reactor together with the desired amount of the liquid serving as the main polymerization reaction diluent. Then ethylene is fed into the resulting catalyst dispersion, with good agitation for a sufficient time to permit polymer to be produced up to the desired percent conversion or yield, as determined for instance by the weight of polymer obtained per unit weight of catalyst used.

The primary feature of the present invention is the use of a solvent or solvent-diluent liquid comprising at least a substantial proportion of a polar non-aromatic organic compound, preferably a halogenated aliphatic hydrocarbon or a halogenated cycloaliphatic hydrocarbon, either as polymerization reaction diluent medium, or as catalyst solvent, or both. A preferred solvent composition is a mixture of a suitable inert hydrocarbon liquid such as a paraffinic hydrocarbon of about 5 to 20 carbon atoms, preferably about 6 to 15 carbon atoms, e.g. normal hexane, normal heptane, or refined inert kerosene or gas oil fraction of petroleum, with a minor proportion such as 1 to 50%, preferably 5 to 30% by volume of the halogenated solvent. The preferred class of halogenated solvents to be used are the completely fluorinated polar compounds containing a saturated ring group such as the perfluorocyclohexyl group $C_6F_{11}$—. Examples of materials in this class include perfluoromethylcyclohexane, which is $C_6F_{11}$–$CF_3$, and a completely fluorinated cyclic $C_8$ ether such as $C_8F_{16}O$. Other examples of suitable polar compounds containing a halogenated cycloaliphatic hydrocarbon group which may be used include: chlorocyclohexane, bromocyclohexane, etc.

Although the halogenated cycloaliphatic compounds are the preferred solvents, one may also use some other halogenated aliphatic materials such as carbon tetrachloride, carbon tetrabromide, tertiary butyl chloride, tertiary butyl bromide, n-butyl chloride perfluorotributyl amine $(C_4F_9)_3N$, chloroform and bromoform, and the various mixed chloro-fluoro compounds commonly used as refrigerants.

The catalyst to be used is prepared by making a combination or complex of two catalyst components, which are preferably mixed together in the form of separate solutions thereof, with agitation and preferably with a suitable catalyst-activating holding time of from about 5 minutes to one hour, preferably about 15 to 45 minutes, at a temperature of about 20 to 100° C., preferably about 40 to 80° C.

One of the catalyst components should be a reducible compound of a metal of groups IVB to VIB, and group VIII of the periodic table, including metals Ti, Zr, Hf, V, Nb, Ta, Cr, Mo, W and Fe.

The other catalyst component should be a reducing agent which may be of several different types, e.g. a metal alkyl such as $AlR_3$ or $AlR_2X$, in which R may be an alkyl group of 1 to 12 or more carbon atoms and X may be hydrogen, a hydrocarbon radical, halogen, alkoxy, or a secondary amine, etc., or the reducing agent may be a metal organo compound such as a magnesium or zinc dialkyl or a Grignard compound. Other reducing agents may be used such as alkali metals or alloys, alkali metal hydrides, or mixtures of alkali metals with metal organic compounds such as mentioned above, e.g. a mixture of sodium and aluminum tridodecyl, or various metal aryl compounds, e.g., Al, Zn, Mg or Na phenyl, toluyl, etc., alone or together with metal alkyls such as aluminum triethyl.

The molar ratio of the aluminum compound to the heavy metal compound in the catalyst mixture may vary widely. Quite generally, the higher the polymer molecular weight desired the higher should be this ratio. A preferred molar ratio for alkyl aluminum compounds to titanium tetrachloride for making polymers above 20,000 molecular weight is about 1–12:1, molar ratios of 1–6:1 and even substantially equimolar proportions, based on metal, being suitable in many cases. Aside from its effect on the molecular weight of the polymer formed, an appreciable variation in the ratio of reducing compound to reducible compound also affects the state of reduction obtained at any other given reducing conditions. In general, increasing this ratio will tend to increase the extent of reduction, permitting a corresponding decrease in the treating temperature for a given catalyst efficiency to be attained.

The concentration of catalyst components to be used may vary somewhat according to the other polymerization reaction factors, but normally range from about 0.1 to 10 grams of total combination catalyst per 100 ml. of diluent, at the start of the polymerization reaction, to be followed, if desired, by additional diluent, the same or a different one, which may amount to an additional 100 or 200 volumes per 100 volumes at the start of polymerization.

The above mentioned preparation of the catalyst may either take place directly in the polymerization reactor or in a separate catalyst preparation zone from which it may be transferred when ready into the polymerization reactor. If additional diluent is to be added this should be done after the catalyst has been prepared and the entire catalyst dispersion should then be brought to the desired polymerization starting temperature which may range from about 20° C. (or room temperature) up to about 100° C., but is preferably about 30 to 50° C., there being generally a further increase in temperature during the course of polymerization. The main operating temperature may be desirably kept in the range of 30° to 80° C. but generally should be about 40 to 70° C.

It should be noted that all equipment used for storage, preparation, transfer, or utilization of the catalyst components and mixed catalyst slurry should be blanketed with suitable inert gas such as nitrogen, because the catalyst components are inflammable and combustible.

When the catalyst-diluent dispersion had been brought to the desired polymerization temperature the olefin to be polymerized, e.g. ethylene, which has preferably been purified for removal of harmful trace impurities, e.g. oxygen, $H_2O$, etc., e.g. by dehydration through activated alumina and contacting with a solution of aluminum triethyl, such as by scrubbing the gas with an n-heptane solution of aluminum triethyl, is contacted with the catalyst dispersion, e.g. by bubbling the ethylene gas up through the catalyst-diluent slurry preferably maintained in a state of good agitation.

Polymerization occurs, and the temperature is permitted to rise to the desired operating temperature, with application of cooling, e.g., by refrigerating jacket, to prevent overheating.

Although the polymerization reaction can be carried out adequately at atmospheric pressure, it is possible to use slightly superatmospheric pressures up to 5 or 10 atmospheres or so.

After the polymerization has been carried out either to the desired catalyst efficiency, as indicated by the production of preferably 50 to 100 grams or more of polymer per gram of catalyst, in the case of batch operation, or until reactor equipment becomes fouled by deposition of polymer on the surfaces of the equipment coming in contact with the reaction liquid, the reaction may be stopped by adding a catalyst deactivator, e.g. by the addition of 0.1 to 1 volume of an alcohol, e.g. ethyl, isopropyl, isobutyl or n-butyl alcohol per volume of polymerization reaction slurry. The polymer is then recovered from the resultant slurry by suitable means such as filtration, centrifuging, etc., and then is preferably washed by stirring with additional amounts of butyl alcohol or other solvent to remove residual traces of catalyst entrained in the polymer. The washed polymer, generally in the form of a granular or powdered material, may then be dried, e.g. by heating and/or vacuum.

The primary feature of the present invention is to discover that if part of the inert hydrocarbon reaction diluent used, such as n-heptane or a highly refined kerosene or gas oil cut, is replaced by a polar non-aromatic organic compound such as perfluoromethylcyclohexane, there results a surprisingly good combination of increased reaction rate and a controlled lowering of the excessively high molecular weight. One difficulty in the use of a combination or complex catalyst of the type being used here is that it is difficult to make polymer product having uniform molecular weight, and also there is a tendency with particular catalysts and particular polymerization conditions to obtain polymer of excessively high molecular weight, e.g 200,000 to 300,000 or higher. Commercially it is desirable to have polymer ranging from about 50,000 to 100,000 molecular weight, and to have a process which will make any desired molecular weight grade consistently, i.e. with relatively little variation from batch to batch or from day to day in continuous operation. From an operating or economic point of view, it is also desirable to have as fast a reaction rate as can be taken care of with the temperature control equipment available, i.e. particularly with whatever cooling means are available to prevent overheating of the reactor.

The present invention comprises replacing about 1 to 50%, preferably about 5 to 40%, of the inert hydrocarbon diluent normally used heretofore, with a polar non-aromatic diluent. This has a combination effect of giving desired molecular weight control, i.e. both preventing excessively high molecular weight, and giving uniform or more consistent molecular weight, and at the same time increasing the reaction rate by an amount of from about 10% to 100%, or more generally about 20% to 50%.

The details and advantages of the invention may be better understood from the consideration of the following experimental data, particularly as illustrated in the accompanying drawing, in which the single figure is a chart plotting the molecular weight against the reaction rate for a series of three tests (in Example II) on the polymerization of ethylene in a hydrocarbon diluent with and without additions of 1 to 10% of a polar fluorinated diluent according to this invention.

EXAMPLE I

A catalyst complex of aluminum triethyl and titanium chloride, having an Al-Ti ratio of 1.28, was prepared by adding a solution of 1.12 grams (.0098 mole) of $Al(C_2H_5)_3$ in 15 grams of n-heptane as diluent, to a solution of 1.53 grams of (.008 mole) of $TiCl_4$ dissolved in 0 gram of n-heptane at the temperature of about 27° C. with shaking. The resulting catalyst was in the form of a finely divided dispersion or suspension of precipitated catalyst complex dispersed in n-heptane diluent.

The preparation of this catalyst dispersion, as well as the subsequent polymerization, were carried out under a blanket of nitrogen. The catalyst dispersion was then transferred to the polymerization reactor which comprises a two liter, 3-neck round bottom flask with indents and equipped with an agitator, thermometer, provision for introducing ethylene and a vent line connected to a wet test meter. 280 grams of n-heptane were added as additional diluent, to bring the total volume up to 420 ccs. The reactor contents were brought to a starting temperature of about 27° C. agitated, and then purified ethylene gas was fed into the bottom of the reactor so it could bubble up through the agitated catalyst dispersion. Polymerization occurred and continued so that over a 90 minute period of time a polymer yield of 68 grams was obtained, thus giving a catalyst efficiency of 26 grams of polymer per gram of catalyst used, and giving a reaction rate of 0.75 gram of polymer per minute. The polymer is a polyethylene having an average molecular weight of 310,000 (by the Harris method). This polymer product was recovered by first adding 400 ccs. of n-butyl alcohol to the reactor to inactivate the catalyst and stop the reaction. Fine granular polymer was then filtered off from the diluent and washed with an additional amount of n-butyl alcohol at a temperature of 27° C., and finally dried at a temperature of 55° C. and 21″ Hg vacuum.

This same experiment was repeated except that in place of adding additional n-heptane as reactor diluent, a mixture was used consisting of 70% by volume of n-heptane and 30% of perfluoromethylcyclohexane ($C_7F_{14}$). With substantially identical polymerization reaction conditions, a polymer yield of 80 grams was obtained in 85 minutes thus giving a reaction rate of 0.94 gram of polymer per minute, which is an increase in reaction rate of 25% compared to the control, and the molecular weight obtained was 55,000, which is much better than the excessively high figure of 310,000 obtained in the control using n-heptane alone as diluent.

In these runs the catalyst was premixed at room temperature at relatively high concentrations. It was then diluted with diluent and transferred to the polymerization vessel.

The results of these tests 1 and 2 are summarized in the following Table I:

Table I

Effect of Fluorocarbons on Polymerization Reaction

| Test No. | 1 | 2 |
|---|---|---|
| Catalyst | Al(Et)$_3$.TiCl$_4$ | Al(Et)$_3$.TiCl$_4$. |
| Al/Ti ratio | 1.20 | 1.28. |
| Solvent | n-Heptane | 30% (volume) perfluoromethyl-cyclohexane. |
| Product, yield gms | 68 | 80. |
| Catalyst efficiency | 26.0 | 27.3. |
| Mol. weight × 10$^{-3}$ | 310 | 55. |
| Time (min.) | 90 | 85. |
| Reaction rate (gms./min.) | 0.75 | 0.94. |
| Increase in reaction rate | | 25%. |

EXAMPLE II

Another set of tests was made in which the catalyst used was a complex of di-isobutyl aluminum monochloride and TiCl$_4$, having an Al—Ti ratio of 1.08:1. This complex was prepared by adding a solution of 1.56 grams (.0088 mole) in 160 grams of a refined kerosene base stock to a solution of 1.62 grams (.0085 mole) of TiCl$_4$ in 160 grams of the same refined kerosene base stock, at a temperature of 27° C. The mixture was then stirred and maintained at a temperature of about 65° C. for a holding time of about 15 minutes. The resulting catalyst dispersion was then transferred to a polymerization reactor and an additional amount of 800 grams of refined kerosene was added to bring the total volume up to about 1400 ccs. With the reactor contents being agitated and maintained at a temperature of about 43° C., purified ethylene gas was bubbled in at the bottom of the reactor. Polymerization occurred and after a period of 300 minutes a polyethylene yield of 359 grams was obtained, thus giving a reaction rate of 1.20 grams of polymer per minute and a catalyst efficiency of 113 grams polymer per gram of catalyst used. The Harris molecular weight of the polymer was 252,000.

A similar test was made except that one volume percent of a completely fluorinated cyclic C$_8$ ether was added to the reactor containing the diluent and catalyst dispersion just prior to feeding ethylene into the reactor. The use of even this very small amount of polar fluorinated diluent caused a tremendous reduction in the Harris molecular weight from 252,000 in test No. 3 down to 189,000 in this test No. 4. This small amount of only 1% of polar fluoro diluent did not materially affect the reaction rate, there being only a slight degree of 3%, from 1.20 down to 1.16 grams polymer per minute. The yield of polymer was 278 grams in 240 minutes but the reaction had to be stopped because of plugging of the reactor due to having insufficient total volume of diluent present. Thus, the catalyst efficiency obtained as only 88, but the activity was still very high, and undoubtedly the yield and catalyst efficiency could have been further increased by an addition of diluent to the reactor if the reactor had been large enough to permit additional diluent.

Another test, No. 5, was run using the same catalyst as in test No. 3 and test No. 4, but using n-heptane in place of the refined kerosene base stock as hydrocarbon diluent, and the addition of 10% by volume of the same polar fluorinated diluent as used in test No. 4. Excellent results were obtained, as the yield of polymer amounted to 350 grams in 200 minutes thereby giving a good high reaction rate of 1.75 grams polymer per minute, which is an increase of 46% over the control test No. 3 and the catalyst efficiency being 110 grams polymer per gram of catalyst, in spite of the fact that the reaction had to be stopped due to the need of additional diluent, even though the catalyst activity was still very high. Likewise, the molecular weight was brought down to 106,000 which is in a very desirable range for commercial utilization.

The results of tests 3, 4 and 5 are compared in the following Table II:

Table II

| Test No. | 3 | 4 | 5 |
|---|---|---|---|
| Catalyst | (a) | (a) | (a) |
| Al/Ti Ratio | 1.08/1 | 1.08/1 | 1.08/1 |
| Solvent composition (percent): | | | |
| Refined kerosene | 100 | 99 | 0 |
| Heptane | 0 | 0 | 90 |
| Fluoroether [1] | 0 | 1 | 10 |
| Product, Yield, Gms | 359 | 278 | 350 |
| Catalyst Efficiency | 113 | [2] 88 | [2] 110 |
| Mol. weight × 10$^{-3}$ | 252 | 189 | 106 |
| Time (min.) | 300 | 240 | 200 |
| Reaction rate (gms./min.) | 1.20 | 1.16 | 1.75 |
| Increase in Reaction Rate | | −3% | 46% | a Al(isobutyl)$_2$Cl.TiCl$_4$.
[1] A cyclic C$_8$ ether completely fluorinated.
[2] Run terminated because of plug. Activity still very high.

The molecular weight and reaction rate data in the above Table II are set forth graphically in the accompanying drawing. Referring to this drawing, on which the molecular weight of the polymer obtained is plotted on the vertical axis, against the reaction rate, on the horizontal axis, and in which the numerical figures along side the points in the curve represent the percent of polar fluorinated diluent used mixed with the hydrocarbon diluent, it is noted that the point marked "0" is in the upper left corner of the chart and thereby shows that the polymer obtained was too high and the reaction rate was slow; this is an undesirable combination. The point marked "1," meaning that one percent of polar chlorinated diluent was used, made a material reduction in the molecular weight, and the point "10" representing the use of 10% polar fluorinated diluent is in the lower right corner of the chart, thus indicating a polymer molecular weight in a desirable medium range of 100,000 molecular weight and a good fast reaction rate.

The above described five tests show that the present invention provides a surprisingly great improvement in increased polymerization reaction rate and give good molecular weight control in the desired medium molecular weight range, thereby making a much more efficient and practical process for manufacturing a high molecular weight polyethylene at substantially atmospheric pressure and moderate temperature with an aluminum alkyl titanium tetrachloride complex catalyst.

It is not intended that this invention be limited to the specific examples and modifications which have been given merely for the sake of illustration but only by the appended claims in which it is intended to claim all novelty inherent in the invention as well as all modifications coming within the scope and spirit of the invention.

What is claimed is:

1. The process of polymerizing alpha olefin compounds which comprises contacting said alpha olefin with a catalyst complex in the presence of an inert reaction diluent comprising a major proportion of a paraffinic hydrocarbon having from 5 to 20 carbon atoms and from 1 to 30% of a completely fluorinated polar compound containing a saturated ring group at a temperature in the range of 20° to 100° C. and at a pressure of from 1 to 10 atmospheres, said catalyst complex comprising a compound of a reducible metal of group IVB of the periodic table and an alkyl aluminum compound reducing agent, the molar ratio of the reducing agent to the compound of a reducible metal being in the range of from 1:1 to 12:1.

2. The process of claim 1 wherein said paraffinic hydrocarbon contains from 6 to 15 carbon atoms and the minor proportion of the completely fluorinated polar compound is from 5 to 30 volume percent, based on total inert diluent.

3. The process according to claim 1 wherein the fluorinated polar compound is selected from the group consisting of a fluorinated cyclic $C_8$ ether and perfluoromethylcyclohexane.

4. Process according to claim 1 in which the catalyst complex is a complex of aluminum triethyl and $TiCl_4$.

5. Process according to claim 1 in which the catalyst complex is a complex of aluminum di-isobutyl monochloride and $TiCl_4$.

6. Process according to claim 5 in which the catalyst complex has an Al—Ti ratio of from 1:1 to 2:1.

7. The process of making solid polyethylene which comprises polymerizing ethylene with a catalyst complex of $TiCl_4$ and diisobutyl aluminum monochloride, said catalyst having an Al/Ti ratio of about 1.08/1, in the presence of an inert polymerization reaction diluent comprising about 10% by volume of completely fluorinated cyclic $C_8$ ether and about 90% by volume of inert volatile petroleum hydrocarbon fraction, at a temperature of about 43° C. and substantially atmospheric pressure, whereby the ethylene is polymerized at a reaction rate of about 1.75 gms./min., and recovering from the polymerization reaction liquid a solid polyethylene having a molecular weight of about 106,000.

References Cited in the file of this patent

UNITED STATES PATENTS

| | | |
|---|---|---|
| 2,440,800 | Hanford et al. | May 4, 1948 |
| 2,644,809 | Saylor | July 7, 1953 |
| 2,683,140 | Howard | July 6, 1954 |
| 2,721,189 | Anderson et al. | Oct. 18, 1955 |
| 2,752,332 | Honn | June 26, 1956 |
| 2,758,953 | Cottle et al. | Aug. 14, 1956 |
| 2,832,759 | Nowlin et al. | Apr. 29, 1958 |

FOREIGN PATENTS

| | | |
|---|---|---|
| 533,362 | Belgium | May 16, 1955 |